(12) United States Patent
Tanaka et al.

(10) Patent No.: US 9,712,814 B2
(45) Date of Patent: Jul. 18, 2017

(54) IMAGING DEVICE AND IMAGING METHOD

(71) Applicant: FUJIFILM Corporation, Tokyo (JP)

(72) Inventors: Yasutake Tanaka, Ashigarakami-gun (JP); Yasunori Ohta, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/073,786

(22) Filed: Mar. 18, 2016

(65) Prior Publication Data

US 2016/0295206 A1 Oct. 6, 2016

(30) Foreign Application Priority Data

Apr. 1, 2015 (JP) ................................. 2015-074779

(51) Int. Cl.
| | |
|---|---|
| *H04N 17/00* | (2006.01) |
| *G03B 17/18* | (2006.01) |
| *H04N 5/232* | (2006.01) |
| *H04N 5/378* | (2011.01) |
| *H04N 5/361* | (2011.01) |

(Continued)

(52) U.S. Cl.
CPC ........... *H04N 17/002* (2013.01); *G03B 17/18* (2013.01); *H04N 5/23245* (2013.01); *H04N 5/361* (2013.01); *H04N 5/378* (2013.01); *G03B 15/03* (2013.01); *G03B 17/02* (2013.01); *H04N 5/2252* (2013.01); *H04N 5/2256* (2013.01); *H04N 5/2354* (2013.01)

(58) Field of Classification Search
CPC .. H04N 17/002; H04N 5/23245; H04N 5/361; H04N 5/378; H04N 5/2252; H04N 5/2256; H04N 5/2354; G03B 17/18; G03B 17/02; G03B 15/03
See application file for complete search history.

(56) References Cited

U.S. PATENT DOCUMENTS

| | | | |
|---|---|---|---|
| 7,148,919 B2 | 12/2006 | Voss | |
| 2005/0099273 A1* | 5/2005 | Shimomura | ........ B60R 25/1004 340/426.1 |

(Continued)

FOREIGN PATENT DOCUMENTS

| | | |
|---|---|---|
| JP | 2002-027326 A | 1/2002 |
| JP | 2004-180317 A | 6/2004 |

OTHER PUBLICATIONS

Communication dated Jun. 1, 2016 from European Patent Office in counterpart Application No. 16161387.2.

*Primary Examiner* — Michael Teitelbaum
(74) *Attorney, Agent, or Firm* — Sughrue Mion, PLLC

(57) ABSTRACT

An imaging device includes an imaging unit which has an imaging element configured to nondestructively read an image signal and performs imaging of a subject using the imaging element, a reading control unit which performs nondestructive reading of the image signal from the imaging element during imaging of the subject, a temporary storage unit which stores the image signal nondestructively read by the reading control unit, an abnormality detection unit which detects the occurrence of an abnormal state during imaging of the subject, and a display control unit which reads and outputs the image signal stored in the storage unit in a case where the abnormal state is detected by the abnormality detection unit.

20 Claims, 8 Drawing Sheets

(51) Int. Cl.
  *G03B 15/03* (2006.01)
  *H04N 5/225* (2006.01)
  *G03B 17/02* (2006.01)
  *H04N 5/235* (2006.01)

(56) References Cited

U.S. PATENT DOCUMENTS

2007/0222877 A1\* 9/2007 Kurane ................ H04N 3/1562
                                              348/294
2009/0066793 A1\* 3/2009 Takeda ................ H04N 17/002
                                              348/148
2010/0074506 A1\* 3/2010 Yamada ................ G01N 1/312
                                              382/133

\* cited by examiner

IMAGING DEVICE AND IMAGING METHOD

CROSS-REFERENCE TO RELATED APPLICATIONS

The present application claims priority under 35 U.S.C. §119 to Japanese Patent Application No. 2015-074779, filed on Apr. 1, 2015. The above application(s) is hereby expressly incorporated by reference, in its entirety, into the present application.

BACKGROUND OF THE INVENTION

1. Field of the Invention

The present invention relates to an imaging device and an imaging method which image light emitted from a subject with an imaging element.

2. Description of the Related Art

Hitherto, an imaging system which has a subject placed inside a housing, irradiates the subject with light using a light source provided in the housing to image the subject has been used in various fields.

In such an imaging system, an imaging method is primarily switched depending on the type of subject, and for example, an imaging system which images chemoluminescence, fluorescence, or reflected light from the subject or transmitted light transmitted through the subject with an imaging element to generate an image has been suggested.

SUMMARY OF THE INVENTION

In the imaging system described above, for example, in a case where a user erroneously open a door of the housing during imaging, since external light enters the housing, external light fogs an image being captured, and the image is invalidated. In a case where abnormality occurs in the imaging element which captures an image, the light source, or the like during imaging, appropriate imaging cannot be performed, and an image is invalidated.

JP2004-180317A and JP2002-27326A disclose an imaging device using an imaging element, and disclose that nondestructive reading from the imaging element is performed to acquire an image signal; however, there is not suggestion that the image signal is used in a case where abnormality occurs in the device described above.

The invention has been accomplished in consideration of the above-described problem, and an object of the invention is to provide an imaging device and an imaging method capable of allowing a user to confirm an image captured immediately before in a case where the user erroneously opens a door of a housing during imaging or in a case where abnormality occurs in an imaging element, a light source, or the like during imaging.

An imaging device of the invention comprises an imaging unit which has an imaging element configured to nondestructively read an image signal and performs imaging of a subject using the imaging element, a reading control unit which performs nondestructive reading of the image signal from the imaging element during imaging of the subject, a storage unit which stores the image signal nondestructively read by the reading control unit, an abnormality detection unit which detects the occurrence of an abnormal state during imaging of the subject, and an output unit which reads and outputs the image signal stored in the storage unit in a case where the abnormal state is detected by the abnormality detection unit.

In the imaging device of the invention, the reading control unit may consecutively perform nondestructive reading of the image signal multiple times.

In the imaging device of the invention, the reading control unit may perform nondestructive reading of the image signal at a given constant time interval set in advance.

The imaging device of the invention may further comprise a housing in which the subject is placed and which has an opening/closing door, and an open state detection unit which detects an open state of the opening/closing door, and the abnormality detection unit may detect the occurrence of the abnormal state in a case where the open state of the opening/closing door is detected by the open state detection unit.

The imaging device of the invention may further comprise an imaging element abnormality detection unit which detects abnormality of the imaging element, and the abnormality detection unit may detect the occurrence of the abnormal state in a case where abnormality of the imaging element is detected by the imaging element abnormality detection unit.

In the imaging device of the invention, the imaging element abnormality detection unit may detect the temperature of the imaging element and may detect abnormality of the imaging element in a case where the detected temperature is outside a range set in advance.

The imaging device of the invention may further comprise a light source unit which irradiates the subject with light, and a light source abnormality detection unit which detects abnormality of the light source unit, and the abnormality detection unit may detect the occurrence of the abnormal state in a case where abnormality of the light source unit is detected by the light source abnormality detection unit.

In the imaging device of the invention, the light source abnormality detection unit may detect abnormality of the light source unit in a case where disconnection or short-circuiting of the light source unit is detected.

In the imaging device of the invention, the abnormality detection unit may detect abnormal states in steps, and the imaging device may further comprise a notification unit which gives notification of the abnormal state in a case where an abnormal state of a first step is detected, and a control unit which stops the imaging in a case where an abnormal state of a second step having a higher degree of abnormality than the first step is detected. The abnormal state of the first step refers to an abnormal state which does not have a significant effect on an image, and is, for example, a state in which the temperature of the imaging element exceeds a threshold by 0.5° C. The abnormal state of the second step is a state in which abnormality appears in an image visibly, and refers to a case where the temperature of the imaging element exceeds the threshold by 10° C., a case where the light source is disconnected (turned off), or a case where the door is opened during imaging.

The imaging device of the invention may further comprise a continuous storage unit which has a nonvolatile memory, and a selection reception unit which receives selection of whether or not to store the nondestructively read image signal read from the storage unit in the continuous storage unit, and the nondestructively read image signal may be stored in the continuous storage unit in a case where the selection reception unit selects to store the nondestructively read image signal, and the nondestructively read image signal may not be stored in the continuous storage unit in a case where the selection reception unit selects not to store the nondestructively read image signal.

As the imaging element, a complementary metal-oxide semiconductor (CMOS) image sensor may be used.

An imaging method of the invention which performs imaging of a subject using an imaging element configured to nondestructively read an image signal comprises performing nondestructive reading of the image signal from the imaging element during imaging of the subject, storing the nondestructively read image signal, and reading and outputting the stored image signal in a case where the occurrence of an abnormal state during imaging of the subject is detected.

According to the imaging device and the imaging method of the invention, when performing imaging of the subject using the imaging element capable of nondestructively reading the image signal, nondestructive reading of the image signal from the imaging element is performed during imaging of the subject, and the nondestructive read image signal is stored. In a case where the abnormal state occurs during imaging of the subject, the stored image signal is read and output; therefore, as described above, even in a case where the user erroneously opens the door of the housing during imaging or a case where abnormality occurs in the imaging element which captures an image, the light source, or the like during imaging, it is possible to allow the user to confirm an image captured immediately before.

DESCRIPTION OF THE PREFERRED EMBODIMENTS

Figure 1:
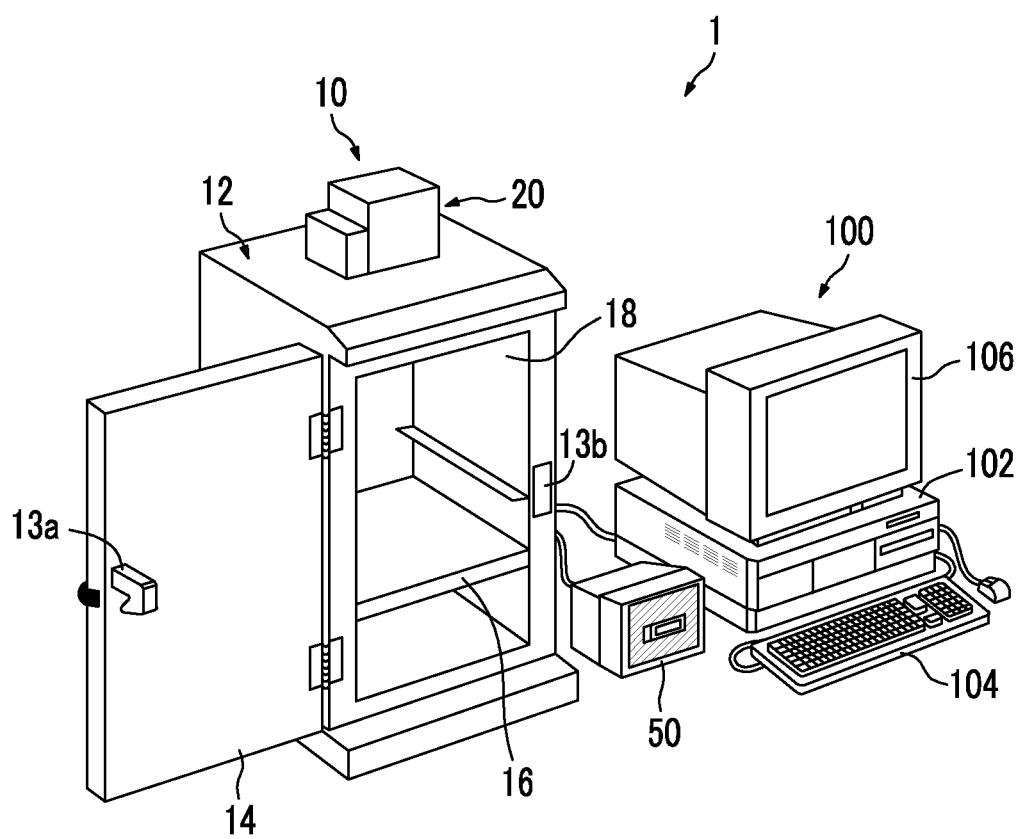
FIG. 1 is a schematic perspective view of an imaging system using an embodiment of an imaging device of the invention.

Hereinafter, an imaging system 1 using a first embodiment of an imaging device and method of the invention will be described in detail referring to the drawings. The imaging system 1 of this embodiment has a feature in processing in a case where an abnormal state occurs during imaging, and first, the overall configuration of the imaging system 1 will be described.

Figure 2:
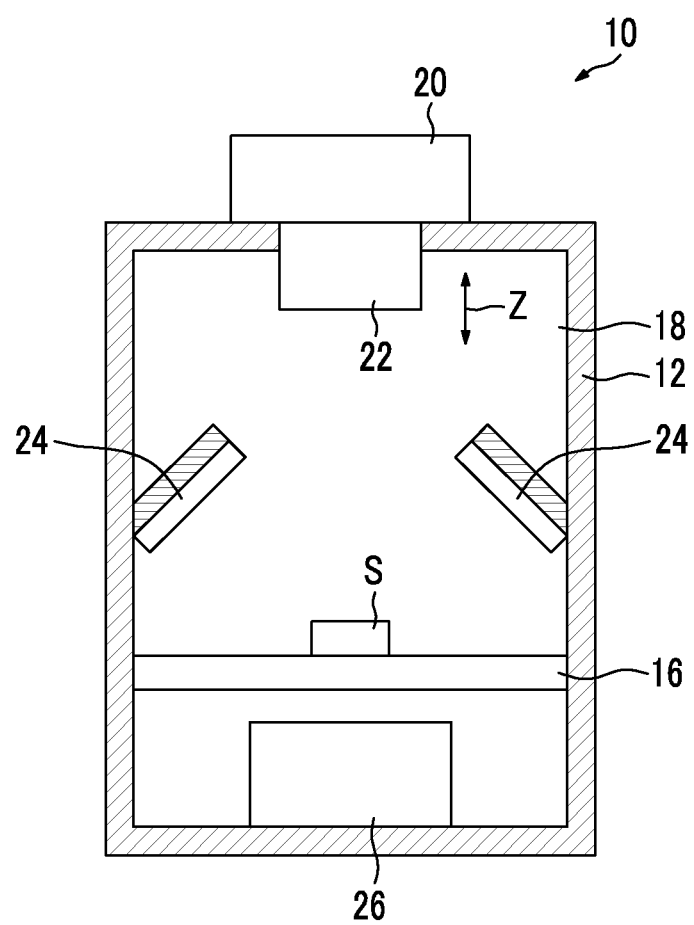
FIG. 2 is a schematic sectional view showing the internal configuration of the embodiment of the imaging device of the invention.
Figure 3:
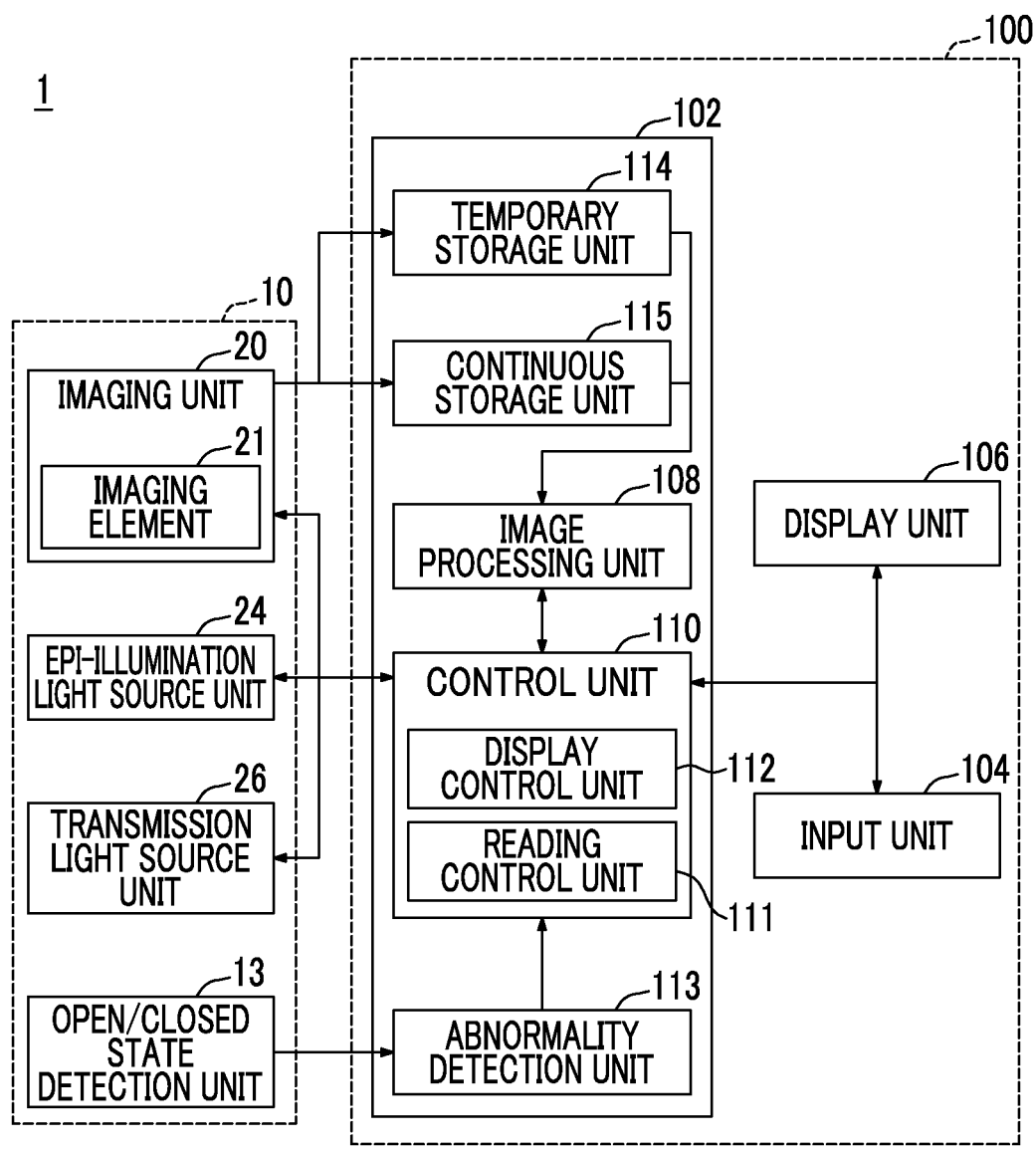
FIG. 3 is a schematic block diagram of an imaging system using a first embodiment of an imaging device of the invention.

FIG. 1 is a schematic perspective view showing the imaging system 1 of this embodiment, FIG. 2 is a schematic sectional view showing the internal configuration of an imaging device of this embodiment, and FIG. 3 is a schematic block diagram showing the imaging system 1 of this embodiment.

As shown in FIGS. 1 and 2, the imaging system 1 of this embodiment includes an imaging device body 10 and an imaging control device 100.

The imaging device body 10 includes a housing 12 which has an opening/closing door 14, a stage 16 on which a subject S is placed, an imaging unit 20, a lens unit 22, an epi-illumination light source unit 24, a transmission light source unit 26, and a subject observation monitor 50. In this embodiment, the epi-illumination light source unit 24 or the transmission light source unit 26 corresponds to a light source unit of the invention.

The housing 12 has a hollow portion 18 formed in a substantially rectangular parallelepiped, and is provided with the stage 16 on which the subject S is placed. The opening/closing door 14 shown in FIG. 1 is openably attached to the housing 12, and the user opens the opening/closing door 14, places the subject S on the stage 16, and then closes the opening/closing door 14, thereby housing the subject S in the housing 12. The housing 12 is constituted of a black box in which external light does not enter the hollow portion 18. The stage 16 is formed of a material which transmits light from the transmission light source unit 26.

In a surface of the opening/closing door 14 on the hollow portion 18 side, when the opening/closing door 14 is closed, a fitting portion 13a which is fitted into a hole 13b formed on the housing body side. An open/closed state detection unit 13 (see FIG. 3) which detects whether or not the fitting portion 13a is fitted is provided in the hole 13b. As described above, the open/closed state detection unit 13 detects the open/closed state of the opening/closing door 14 by detecting whether or not the fitting portion 13a is fitted into the hole 13b. As the open/closed state detection unit 13, a micro switch, an optical sensor, or the like is available. The open/closed state detection unit 13 of this embodiment corresponds to an open state detection unit of the invention.

The imaging unit 20 is fixed to the upper surface of the housing 12, includes, for example, an imaging element 21, such as a complementary metal-oxide semiconductor (CMOS) image sensor, and detects light reflected from the subject S, light emitted from the subject S, or light transmitted through the subject S to generate an image signal. The image signal generated in the imaging unit 20 is subjected to, for example, amplification processing and then output to the imaging control device 100.

The lens unit 22 is attached to the imaging unit 20. The lens unit 22 includes, for example, a plurality of lenses, and the lenses are provided so as to be movable in a direction of an arrow Z to focus on the subject S. The lens unit 22 includes, for example, optical elements, such as a diaphragm and an excitation light cut filter, and adjusts the amount or the wavelength of light to be detected.

The epi-illumination light source unit 24 and the transmission light source unit 26 respectively have, for example, an excitation light source for fluorescent imaging and a white light source, and the light sources are switched under the control of the imaging control device 100 as necessary. For example, in a case of performing imaging for detecting fluorescence emitted from the subject S fluorescence-labeled, the subject S is irradiated with excitation light from the epi-illumination light source unit 24 or the transmission light source unit 26, in a case of performing imaging for detecting reflected light from the subject S, the subject S is irradiated with white light from the epi-illumination light source unit 24, and in a case of performing imaging for detecting transmitted light transmitted through the subject S, the subject S is irradiated with white light from the transmission light source unit 26.

The subject observation monitor 50 displays a status on the stage 16 imaged by a small camera (not shown) provided in the upper portion of the housing 12. With this, it is possible to confirm the position of the subject S placed on the stage 16 or the height of the stage 16, and to adjust the position of the subject S or the height of the stage 16 such that the subject S is placed suitably for imaging.

The imaging control device 100 is constituted of, for example, a computer, and includes a control device body 102, an input unit 104, and a display unit 106. The imaging control device 100 controls the operations of the imaging unit 20, the epi-illumination light source unit 24, and the transmission light source unit 26 of the imaging device body 10, and the imaging device body 10 images the subject S under the control of the imaging control device 100. In this embodiment, the imaging unit 20 and the open/closed state detection unit 13 in the imaging device body 10, a reading control unit 111 and a display control unit 112 in the imaging control device 100, and an abnormality detection unit 113 constitute an imaging device of the invention. In this embodiment, the display control unit 112 corresponds to an output unit and a notification unit of the invention.

As shown in FIG. 3, the control device body 102 includes an image processing unit 108, a control unit 110, an abnormality detection unit 113, a temporary storage unit 114, and a continuous storage unit 115. In this embodiment, the temporary storage unit 114 corresponds to a storage unit of the invention.

The control unit 110 includes, for example, a central processing unit (CPU), a read only memory (ROM), and the like. The control unit 110 integrally controls the operations of the respective units in the imaging device body 10 and the imaging control device 100.

The control unit 110 includes the reading control unit 111 and the display control unit 112. The reading control unit 111 reads and controls the image signal from the imaging element 21 in the imaging unit 20.

The reading control unit 111 of the embodiment reads an image signal of an observation image from the imaging element 21 when an exposure time set in advance has elapsed, and performs nondestructive reading of the image signal at a given constant time interval for the exposure time (during imaging of the observation image). Nondestructive reading refers to a method which, when reading the image signal from the imaging element 21, reads the image signal while maintaining the storage state without emptying electric charge stored in each photoelectric conversion element constituting the imaging element 21. That is, since reset processing is not performed when reading the image signal, it is possible to read the image signal any number of times in the middle of storing electric charge. The reading control unit can consecutively perform nondestructive reading of the image signal multiple times, and for example, performs nondestructive reading about two times to 12 times. The reading control unit can perform nondestructive reading of the image signal at a given constant time interval set in advance, and for example, performs reading at an interval of, for example, 0.1 seconds to 60 minutes.

However, the invention is not limited to the above.

The continuous storage unit 115 stores the image signal of the observation image. As the continuous storage unit 115, for example, a nonvolatile memory, such as a flash memory, is available. The continuous storage unit 115 can store the image signal acquired by nondestructive reading in response to a request from the user.

The temporary storage unit 114 stores the image signal acquired by nondestructive reading. As the temporary storage unit 114, for example, a volatile memory, such as a synchronous dynamic random access memory (SDRAM), is available. In the embodiment, the temporary storage unit 114 corresponds to a storage unit of the invention.

The image processing unit 108 receives the image signals read from the continuous storage unit 115 and the temporary storage unit 114 as input and subjects the read image signals to necessary signal processing. The signal processing includes, for example, dark current correction processing, sharpness processing, and the like. The dark current correction processing is processing for subtracting a dark image signal stored in advance from an image signal acquired by imaging.

The display control unit 112 displays the observation image on the display unit 106 based on the image signal subjected to the signal processing in the image processing unit 108. The display control unit 112 reads the nondestructively read image signal stored in the temporary storage unit 114 in a case where the abnormality detection unit 113 detects the occurrence of an abnormal state during imaging, and displays a confirmation image on the display unit 106 based on the image signal subjected to the signal processing in the image processing unit 108.

In a case where the abnormality detection unit 113 detects the occurrence of the abnormal state during imaging, the display control unit 112 displays a warning, such as a message informing the user of the effect on the display unit 106. Instead of a message, an index, such as a mark, may be displayed. In this embodiment, although a message or the like is displayed to give the user a warning, the invention is not limited thereto, a lamp may be turned on or sound may be made to give notification to the user.

The abnormality detection unit 113 detects the occurrence of the abnormal state during imaging of the subject S. Specifically, in a case where the open/closed state detection unit 13 detects that the opening/closing door 14 is opened during imaging of the observation image, the abnormality detection unit 113 of this embodiment receives the detection signal and detects the occurrence of the abnormal state during imaging. In a case where the abnormality detection unit 113 detects the occurrence of the abnormal state during imaging, as described above, the display control unit 112 reads the nondestructively read image signal most recently stored in the temporary storage unit 114, the image signal is subjected to the signal processing in the image processing unit 108, and then, a confirmation image is displayed on the display unit 106 based on the image signal subjected to the signal processing.

The display unit 106 comprises, for example, a display device, such as a cathode ray tube (CRT) display or a liquid crystal display, and as described above, displays the observation image and the confirmation image, or displays the warning message. The display unit 106 displays a setting screen for performing various settings in or giving instructions to the respective units of the imaging device body 10.

The input unit 104 comprises a mouse, a keyboard, and the like. The input unit 104 receives various setting inputs of the respective units in the imaging device body 10. The input unit 104 receives selection of whether or not to store the nondestructively read image signal read from the temporary storage unit 114 in the continuous storage unit 115. The input unit 104 of this embodiment corresponds to a selection reception unit of the invention.

The imaging system 1 of this embodiment has the above configuration, thereby performing imaging by four imaging methods according to the type of subject S or the purpose of imaging. The four imaging methods include an imaging method (hereinafter, referred to as a first imaging method) which detects chemoluminescence emitted from the subject S, an imaging method (hereinafter, referred to as a second imaging method) which detects fluorescence emitted from the subject S, an imaging method (hereinafter, referred to as a third imaging method) which detects reflected light reflected from the subject S, and an imaging method (hereinafter, referred to as a fourth imaging method) which detects transmitted light transmitted through the subject S.

In the first imaging method, a phenomenon (chemoluminescence or chemiluminescence) in which, when a subject molecule excited by a chemical reaction is returned to a ground state, energy is discharged as light is used. With this, for example, it is possible to perform genetic analysis, inspection and research of biological tissues relating to diseases and aging, deterioration evaluation of organic compounds and polymer compounds, and the like. For example, an imaging target substance in a subject is labeled by a labeling substance which generates chemoluminescence when coming into contact with a chemoluminescence substrate, and thereafter, the chemoluminescence substrate is brought into contact with the labeling substance, whereby chemoluminescence can be generated. In the first imaging method, light irradiation from the epi-illumination light source unit 24 and the transmission light source unit 26 is not performed.

In the second imaging method, excitation light is irradiated from the epi-illumination light source unit 24 or the transmission light source unit 26, and fluorescence from a fluorescence substance labeling an imaging target substance in a subject is detected. As the subject S of the second imaging method, for example, a gel support containing a deoxyribonucleic acid (DNA) fragment fluorescence-labeled and separated by electrophoresis is considered. If this imaging system 1 is used, the distribution of the DNA fragment in the gel support can be imaged and evaluated.

In the third imaging method, for example, white light is irradiated as illumination light from the epi-illumination light source unit 24, and reflected light of illumination light from the subject S is detected. With this, it is possible to obtain a digital image by photoelectrically reading a reflective original, such as a photograph. In the fourth imaging method, white light is irradiated as illumination light from the transmission light source unit 26, and transmitted light of illumination light transmitted through the subject S is detected. With this, it is possible to obtain a digital image by photoelectrically reading a transmissive original, such as a film.

Figure 4:
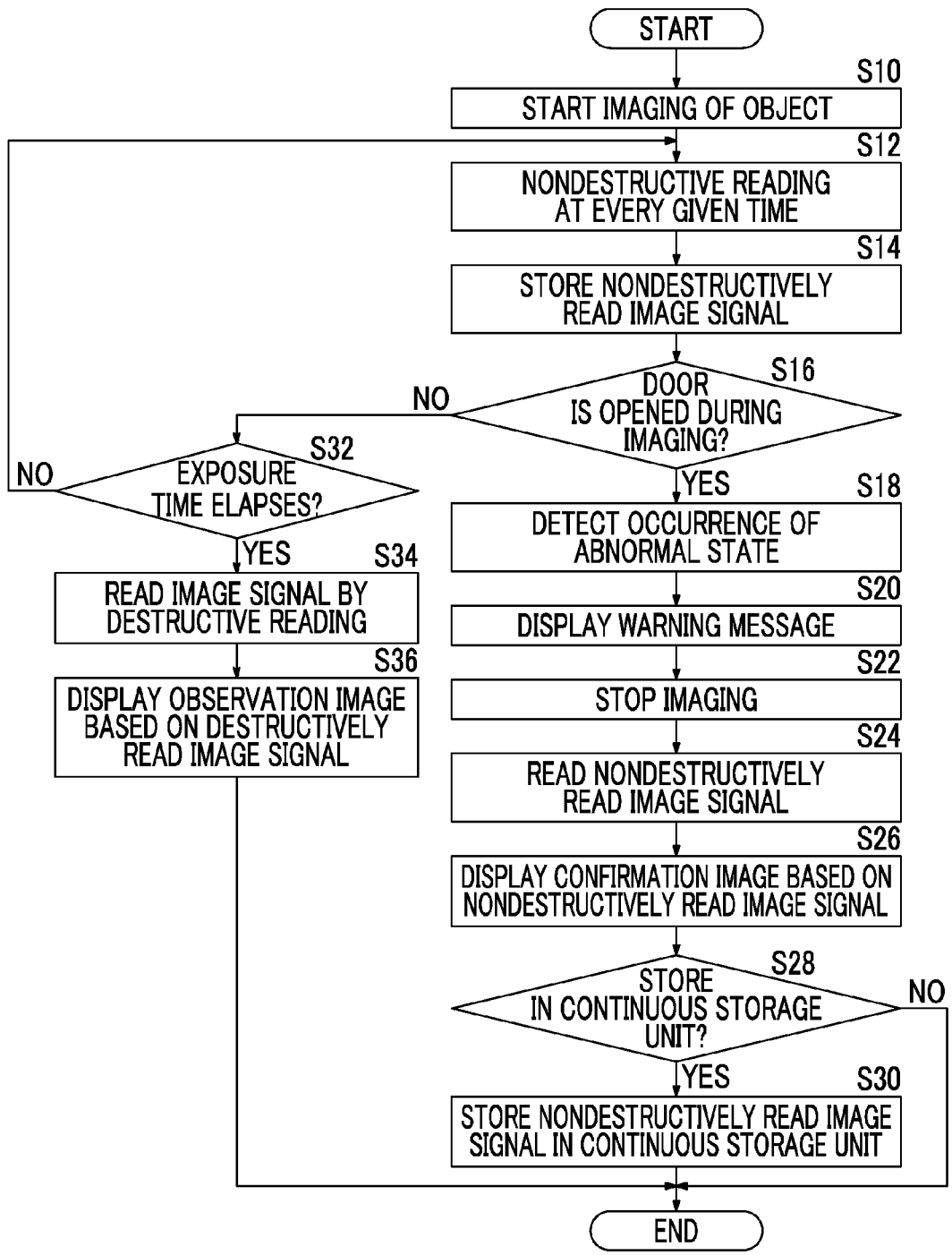
FIG. 4 is a flowchart illustrating the action of the imaging system using the first embodiment of the imaging device of the invention.

Next, the action of the imaging system 1 of this embodiment will be described referring to the flowchart shown in FIG. 4.

First, after the subject S is placed on the stage 16 of the imaging device body 10, an imaging start instruction is input by the user using the input unit 104, and imaging by the imaging unit 20 is started. Specifically, exposure of the imaging element 21 of the imaging unit 20 is started (S10).

After imaging is started, an image signal is read from the imaging element 21 at a given constant time interval (for example, an interval of one second) by nondestructive reading (S12), and the image signal is sequentially stored in the temporary storage unit 114 (S14).

In a case where the opening/closing door 14 is erroneously opened by the user during imaging of the subject S (S16, YES), the open/closed state detection unit 13 detects this state, the abnormality detection unit 113 receives the detection signal, and the abnormality detection unit 113 detects the occurrence of an abnormal state during imaging (S18).

In a case where the abnormality detection unit 113 detects the occurrence of the abnormal state during imaging, the display control unit 112 displays a warning message on the display unit 106 (S20), and the control unit 110 stops imaging (S22).

Next, the display control unit 112 reads the nondestructively read image signal most recently stored in the temporary storage unit 114 (S24).

The nondestructively read image signal read from the temporary storage unit 114 is input to the image processing unit 108 and is subjected to signal processing in the image processing unit 108, and then, the display control unit 112 displays a confirmation image on the display unit 106 based on the image signal subjected to the signal processing (S26).

A selection screen of whether or not to store the nondestructively read image signal in the continuous storage unit 115 is displayed on the display unit 106, and in a case where the user selects to store the image signal in the continuous storage unit 115 using the input unit 104 (S28, YES), the nondestructively read image signal is stored in the continuous storage unit 115 (S30). In a case where the user selects not to store the image signal in the continuous storage unit 115 (S28, NO), the nondestructively read image signal is not stored in the continuous storage unit 115, and the processing ends. In this way, the user selects whether or not to store the nondestructively read image signal in the continuous storage unit 115, whereby only a necessary image signal can be stored in the continuous storage unit 115.

In a case where the door is not opened during imaging and an imaging exposure time set in advance has elapsed (S32, YES), the reading control unit 111 reads the image signal from the imaging element 21 by destructive reading, and the image signal is stored in the continuous storage unit 115 (S34). Destructive reading refers to a reading method which, when reading the image signal from the photoelectric conversion element of the imaging element 21, performs reset processing for emptying electric charge stored in the photoelectric conversion element.

The display control unit 112 reads the destructively read image signal stored in the continuous storage unit 115, the image signal is subjected to signal processing in the image processing unit 108, and then, the display control unit 112 displays an observation image on the display unit 106 based on the image signal subjected to the signal processing (S36).

According to the imaging system 1 of the first embodiment described above, nondestructive reading of the image signal from the imaging element 21 is performed during imaging of the subject S, and the nondestructively read image signal is stored. In a case where the occurrence of an abnormal state during imaging of the subject S is detected, the stored image signal is read and output; thus, even in a case where the user erroneously opens the door of the housing 12 during imaging, it is possible to allow the user to confirm the image captured immediately before.

Next, an imaging system 2 using a second embodiment of an imaging device and method of the invention will be described. In the imaging system 1 of the first embodiment, although the abnormality detection unit 113 detects the occurrence of the abnormal state during imaging in a case where the opening/closing door 14 is erroneously opened during imaging, the imaging system 2 of the second embodiment detects the occurrence of the abnormal state during imaging in a case where abnormality of the imaging element 21 is detected. Specifically, the imaging system 2 of the second embodiment detects temperature abnormality of the imaging element 21. This is because, if the temperature of the imaging element 21 changes, a dark current level changes and has magnitude different from the dark image signal for use when performing the dark current correction processing described above, and appropriate dark current correction processing cannot be performed. In the imaging system 2 of the second embodiment, other configurations are the same as those in the imaging system 1 of the first embodiment.

Figure 5:
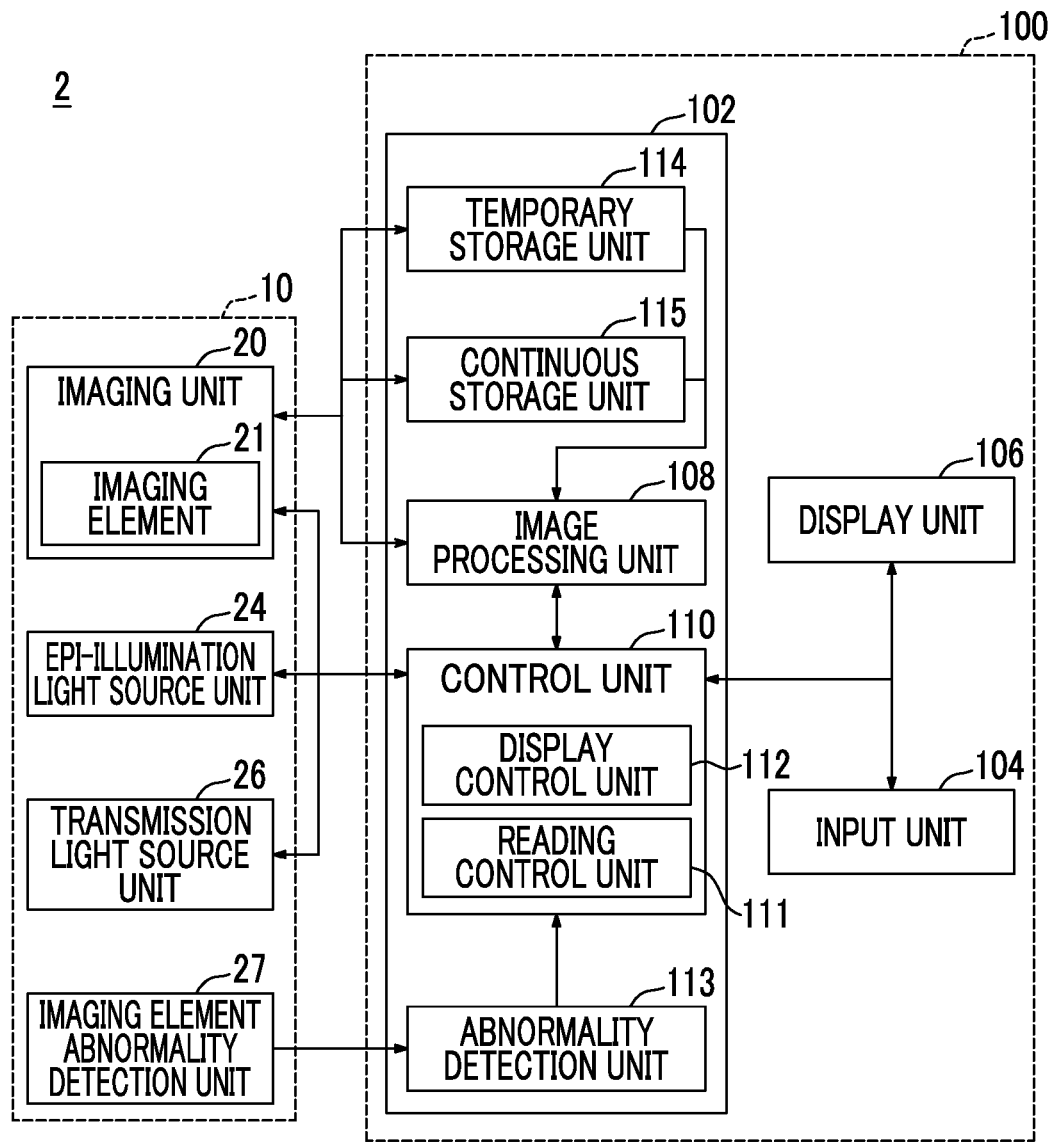
FIG. 5 is a schematic block diagram of an imaging system using a second embodiment of an imaging device of the invention.

FIG. 5 is a block diagram showing the schematic configuration of the imaging system 2 of the second embodiment. As shown in FIG. 5, an imaging device body 10 of the imaging system 2 of the second embodiment is provided with an imaging element abnormality detection unit 27 which detects abnormality of the imaging element 21. Specifically, the imaging element abnormality detection unit 27 of this embodiment comprises a temperature sensor which detects the temperature of the imaging element 21, and detects abnormality of the imaging element 21 in a case where the temperature detected by the temperature sensor is outside a range set in advance. The imaging element abnormality detection unit 27 may directly detect the temperature of the imaging element 21, or may detect the temperature of outside air near the imaging element 21 to indirectly the temperature of the imaging element 21.

Figure 6:
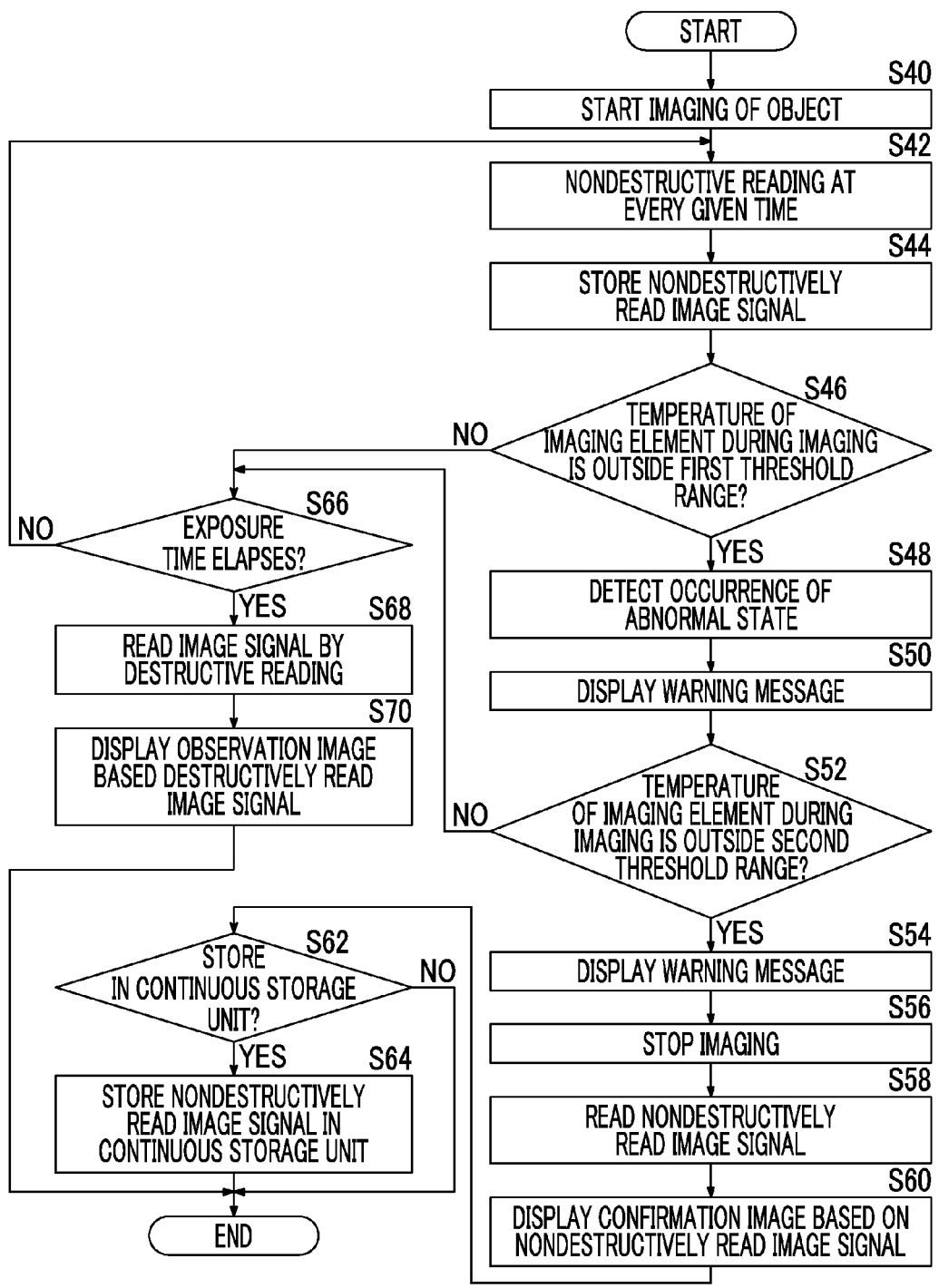
FIG. 6 is a flowchart illustrating the action of the imaging system using the second embodiment of the imaging device of the invention.

Next, the action of the imaging system 2 of this embodiment will be described referring to the flowchart shown in FIG. 6.

First, after the subject S is placed on the stage 16 of the imaging device body 10, an imaging start instruction is input by the user using the input unit 104, and imaging by the imaging unit 20 is started (S40).

After imaging is started, an image signal is read from the imaging element 21 at a given constant time interval by nondestructive reading (S42), and the image signal is sequentially stored in the temporary storage unit 114 (S44).

In a case where the temperature of the imaging element 21 is outside a first threshold range during imaging of the subject S (S46, YES), the imaging element abnormality detection unit 27 detects this state, the abnormality detection unit 113 receives the detection signal, and the abnormality detection unit 113 detects the occurrence of the abnormal state during imaging (S48). The first threshold range is set to, for example, −25° C.±0.5° C.

As described above, in a case where the temperature of the imaging element 21 is outside the first threshold range, first, the display control unit 112 displays a warning message on the display unit 106 (S50).

Subsequently, imaging is continued, and in a case where the temperature of the imaging element 21 continues to change and is outside a second threshold range (S52, YES), the display control unit 112 further displays a warning message on the display unit 106 (S54), and the control unit 110 stops imaging (S56). The second threshold range is set to, for example, −25° C.±1° C.

Next, the display control unit 112 reads the nondestructively read image signal most recently stored in the temporary storage unit 114 (S58).

The nondestructively read image signal read from the temporary storage unit 114 is input to the image processing unit 108 and is subjected to signal processing in the image processing unit 108, and then, the display control unit 112 displays a confirmation image on the display unit 106 based on the image signal subjected to the signal processing (S60).

A selection screen of whether or not to store the nondestructively read image signal in the continuous storage unit 115 is displayed on the display unit 106, and in a case where the user selects to store the image signal in the continuous storage unit 115 (S62, YES), the nondestructively read image signal is stored in the continuous storage unit 115 (S64). In a case where the user selects not to store the image signal in the continuous storage unit 115 (S62, NO), the nondestructively read image signal is not stored in the continuous storage unit 115, and the processing ends.

In a case where the temperature of the imaging element 21 is not outside the first threshold range during imaging (S46, NO) and in a case where the temperature of the imaging element 21 is outside the first threshold range during imaging and is not outside the second threshold range (S52, NO), when an imaging exposure time set in advance has elapsed (S66, YES), the reading control unit 111 reads the image signal from the imaging element 21 by destructive reading, and the image signal is stored in the continuous storage unit 115 (S68).

The display control unit 112 reads the destructively read image signal stored in the continuous storage unit 115, the image signal is subjected to signal processing in the image processing unit 108, and then, the display control unit 112 displays an observation image on the display unit 106 based on the image signal subjected to the signal processing (S70).

According to the imaging system 2 of the second embodiment described above, even in a case where abnormality occurs in the imaging element 21 during imaging, it is possible to subject an image captured immediately before to appropriate dark current correction processing, and to allow the user to confirm the image.

Next, an imaging system 3 using a third embodiment of an imaging device and method of the invention will be described. In the imaging system 2 of the second embodiment, although the abnormality detection unit 113 detects the occurrence of the abnormal state during imaging in a case where abnormality of the imaging element 21 is detected, the imaging system 3 of the third embodiment detects the occurrence of the abnormal state during imaging in a case where abnormality of the light source is detected. In the imaging system 3 of the third embodiment, other configurations are the same as those in the imaging system 1 of the first embodiment.

Figure 7:
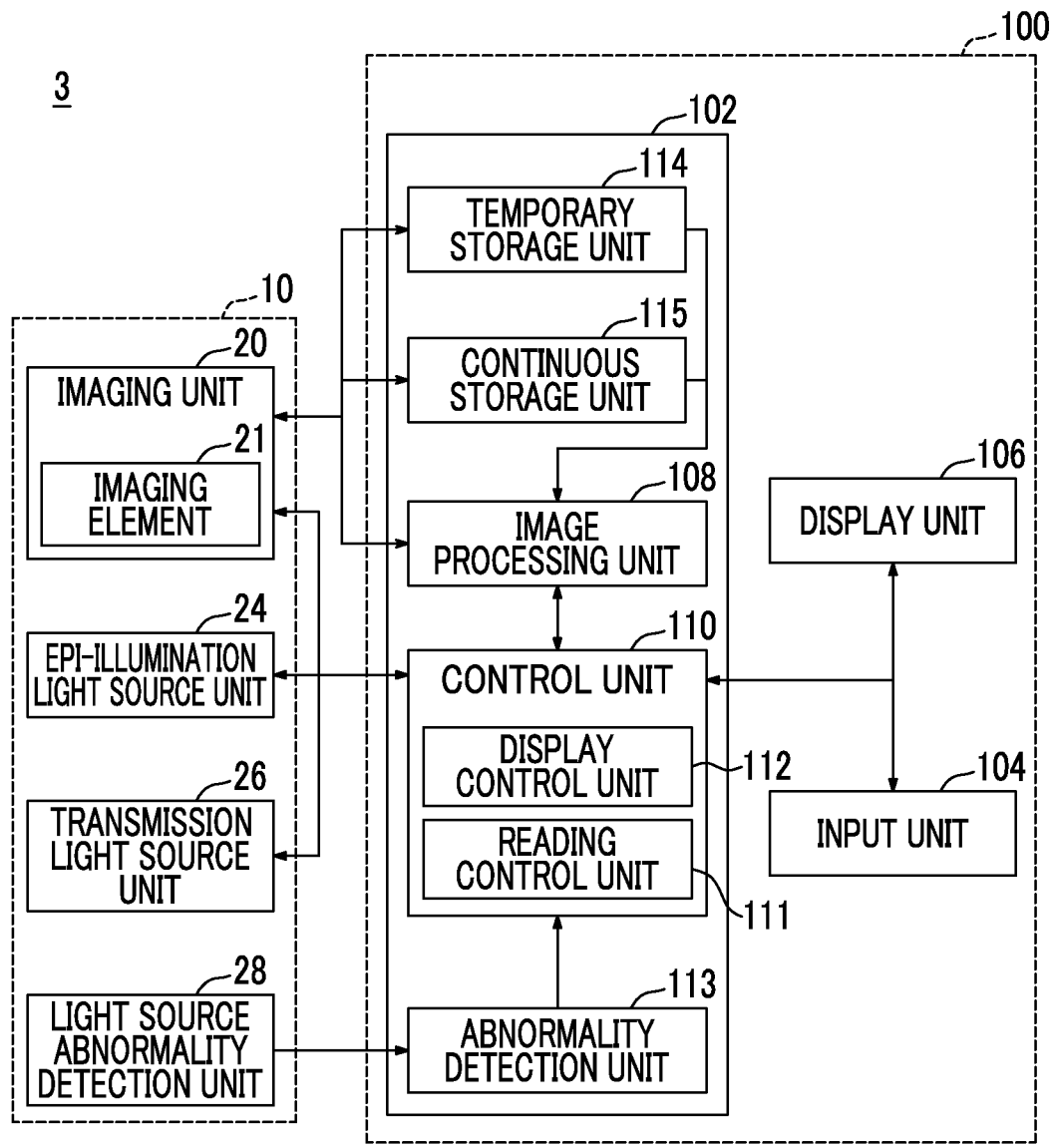
FIG. 7 is a schematic block diagram of an imaging system using a third embodiment of an imaging device of the invention.

FIG. 7 is a block diagram showing the schematic configuration of the imaging system 3 of the third embodiment. As shown in FIG. 7, an imaging device body 10 of the imaging system 3 of the third embodiment is provided with a light source abnormality detection unit 28 which detects abnormality of the epi-illumination light source unit 24 and the transmission light source unit 26. Specifically, the light source abnormality detection unit 28 of this embodiment detects disconnection or short-circuiting in the epi-illumination light source unit 24 and the transmission light source unit 26. In regards to disconnection and short-circuiting in the epi-illumination light source unit 24 and the transmission light source unit 26, for example, a disconnection and short-circuiting detection function of an IC which drives and controls the light sources may be used, or a voltage or the like applied to the epi-illumination light source unit 24 and the transmission light source unit 26 may be monitored.

Figure 8:
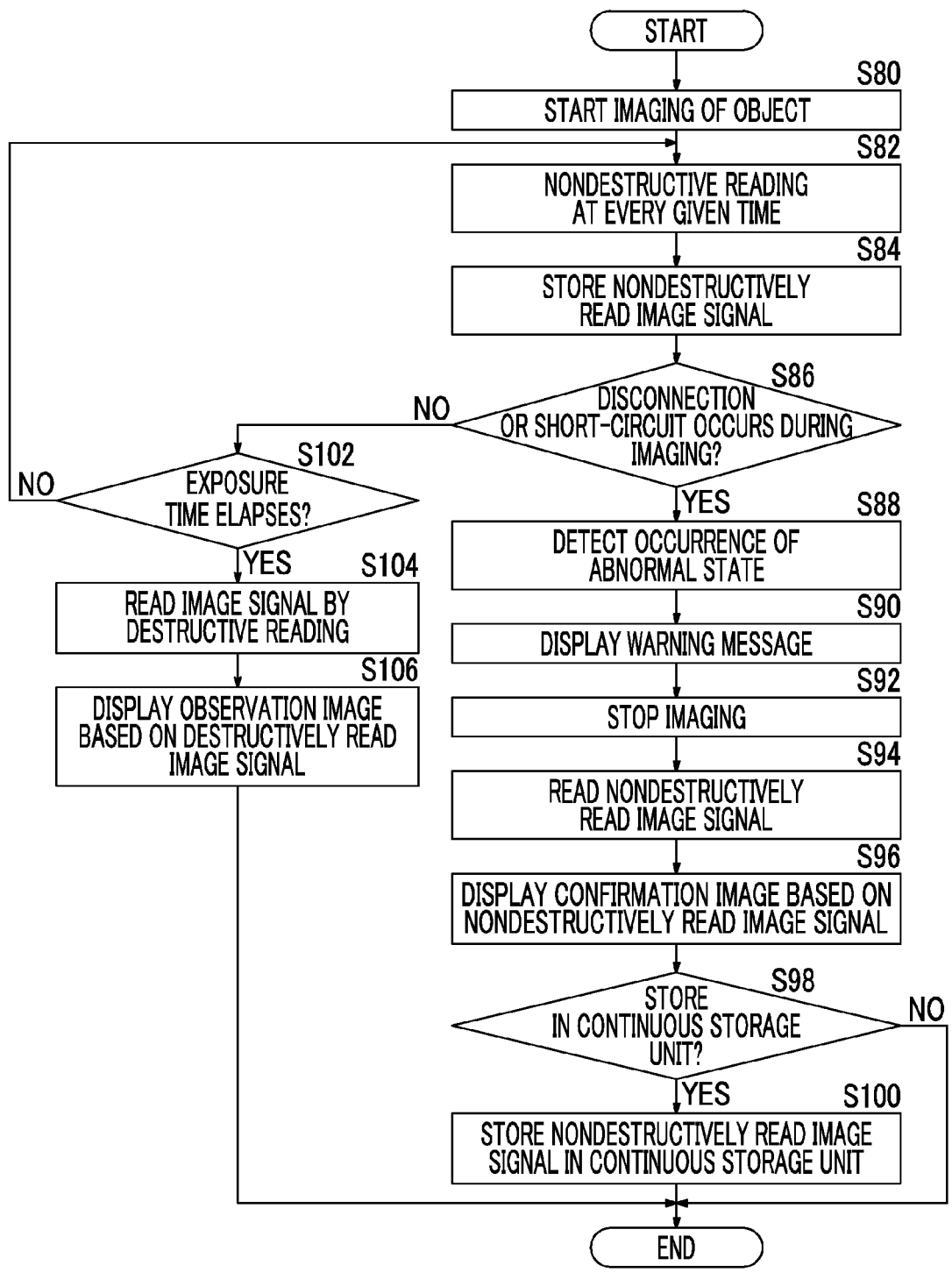
FIG. 8 is a flowchart illustrating the action of the imaging system using the third embodiment of the imaging device of the invention.

Next, the action of the imaging system 3 of this embodiment will be described referring to the flowchart shown in FIG. 8.

First, after the subject S is placed on the stage 16 of the imaging device body 10, an imaging start instruction is input by the user using the input unit 104, and imaging by the imaging unit 20 is started (S80).

After imaging is started, an image signal is read from the imaging element 21 at a given constant time interval by nondestructive reading (S82), and the image signal is sequentially stored in the temporary storage unit 114 (S84).

In a case where disconnection or short-circuiting of the epi-illumination light source unit 24 or the transmission light source unit 26 occurs during imaging of the subject S (S86, YES), the light source abnormality detection unit 28 detects this state, the abnormality detection unit 113 receives the detection signal, and the abnormality detection unit 113 detects the occurrence of the abnormal state during imaging (S88).

In a case where the abnormality detection unit 113 detects the occurrence of the abnormal state during imaging, the display control unit 112 displays a warning message on the display unit 106 (S90), and the control unit 110 stops imaging (S92).

Next, the display control unit 112 reads the nondestructively read image signal most recently stored in the temporary storage unit 114 (S94).

The nondestructively read image signal read from the temporary storage unit 114 is input to the image processing unit 108 and is subjected to signal processing in the image processing unit 108, and then, the display control unit 112 displays a confirmation image on the display unit 106 based on the image signal subjected to the signal processing (S96).

A selection screen of whether or not to store the nondestructively read image signal in the continuous storage unit 115 is displayed on the display unit 106, and in a case where the user selects to store the image signal in the continuous storage unit 115 (S98, YES), the nondestructively read image signal is stored in the continuous storage unit 115 (S100). In a case where the user selects not to store the image signal in the continuous storage unit 115 (S98, NO), the nondestructively read image signal is not stored in the continuous storage unit 115, and the processing ends.

In a case where disconnection or short-circuiting of the epi-illumination light source unit 24 or the transmission light source unit 26 does not occur and an imaging exposure time set in advance has elapsed (S102, YES), the reading control unit 111 reads the image signal from the imaging element 21 by destructive reading, and the image signal is stored in the continuous storage unit 115 (S104). Destructive reading refers to a reading method which, when reading the image signal from the photoelectric conversion element of the imaging element 21, performs reset processing for emptying electric charge stored in the photoelectric conversion element.

The display control unit 112 reads the destructively read image signal stored in the continuous storage unit 115, the image signal is subjected to signal processing in the image processing unit 108, and then, the display control unit 112 displays an observation image on the display unit 106 based on the image signal subjected to the signal processing (S106).

According to the imaging system 3 of the third embodiment described above, even in a case where abnormality occurs in the light source during imaging, it is possible to allow the user to confirm an image captured immediately before.

Although the imaging system 1 of the first embodiment described above detects that the opening/closing door 14 is opened during imaging, the imaging system 2 of the second embodiment detects the occurrence of abnormality in the imaging element 21, and the imaging system 3 of the third embodiment detects the occurrence of abnormality in the light source, all of these abnormalities may be detected. In this case, the abnormality detection unit 113 may detect abnormal states in steps and may be operated according to the degree of abnormality.

Specifically, in a case where an abnormal state is detected during imaging and this abnormality is abnormality of the temperature of the imaging element 21, and as in the second embodiment described above, in a case where the temperature of the imaging element 21 is outside the first threshold range (for example, $-25°$ C.$\pm 0.5°$ C.) and is within the second threshold range (for example, $-25°$ C.$\pm 1°$ C.), since the degree of abnormality is not so high, display of a warning message by the display control unit 112 is performed without stopping imaging. In a case where the temperature of the imaging element 21 is outside the second threshold range (for example, $-25°$ C.$\pm 1°$ C.), since the degree of abnormality is high, the display control unit 112 displays a warning message and the control unit 110 stops imaging.

In a case the abnormal state is detected during imaging and this abnormality is disconnection or short-circuiting of the epi-illumination light source unit 24 or the transmission light source unit 26 and a case where this abnormality is the detection of the open state of the opening/closing door 14, as in the first and third embodiments, the display control unit 112 displays a warning message and the control unit 110 stops imaging. In this way, the abnormal states are detected in steps, whereby it is possible to prevent imaging from being wastefully stopped.

What is claimed is:

1. An imaging device disposed to image an interior of a light-blocking test chamber comprising:
    an imaging unit which has an imaging element configured to nondestructively read an image signal and performs imaging of a subject located within the interior of the light-blocking test chamber, using the imaging element;
    a reading control processor which performs nondestructive reading of the image signal from the imaging element during imaging of the subject;
    a storage unit which stores the image signal nondestructively read by the reading control processor;
    an abnormality detection processor which detects the occurrence of an abnormal state during imaging of the subject, wherein the abnormal state comprises at least one of a defect of the imaging element and light level variation within the light-blocking test chamber during imaging; and
    an output processor which reads and outputs the image signal stored in the storage unit in a case where the abnormal state is detected by the abnormality detection processor.

2. The imaging device according to claim 1, wherein the reading control processor consecutively performs nondestructive reading of the image signal multiple times.

3. The imaging device according to claim 2, wherein the reading control processor performs nondestructive reading of the image signal at a given constant time interval set in advance.

4. The imaging device according to claim 1, wherein the light-blocking test chamber in which the subject is placed has an opening/closing door and imaging of the subject occurs with the door in the closed state; and further comprising:
an open state detection processor which detects an open state of the opening/closing door,
wherein the abnormality detection processor detects the occurrence of the abnormal state in a case where the open state of the opening/closing door is detected by the open state detection processor.

5. The imaging device according to claim 2,
wherein the light-blocking test chamber in which the subject is placed has an opening/closing door and imaging of the subject occurs with the door in the closed state; and further comprising:
an open state detection processor which detects an open state of the opening/closing door,
wherein the abnormality detection processor detects the occurrence of the abnormal state in a case where the open state of the opening/closing door is detected by the open state detection processor.

6. The imaging device according to claim 3,
wherein the light-blocking test chamber in which the subject is placed has an opening/closing door and imaging of the subject occurs with the door in the closed state; and
an open state detection processor which detects an open state of the opening/closing door,
wherein the abnormality detection processor detects the occurrence of the abnormal state in a case where the open state of the opening/closing door is detected by the open state detection processor.

7. The imaging device according to claim 1, further comprising:
an imaging element abnormality detection processor which detects abnormality of the imaging element,
wherein the abnormality detection processor detects the occurrence of the abnormal state in a case where abnormality of the imaging element is detected by the imaging element abnormality detection processor.

8. The imaging device according to claim 2, further comprising:
an imaging element abnormality detection processor which detects abnormality of the imaging element,
wherein the abnormality detection processor detects the occurrence of the abnormal state in a case where abnormality of the imaging element is detected by the imaging element abnormality detection processor.

9. The imaging device according to claim 3, further comprising:
an imaging element abnormality detection processor which detects abnormality of the imaging element,
wherein the abnormality detection processor detects the occurrence of the abnormal state in a case where abnormality of the imaging element is detected by the imaging element abnormality detection processor.

10. The imaging device according to claim 4, further comprising:
an imaging element abnormality detection processor which detects abnormality of the imaging element,
wherein the abnormality detection processor detects the occurrence of the abnormal state in a case where abnormality of the imaging element is detected by the imaging element abnormality detection processor.

11. The imaging device according to claim 5, further comprising:
an imaging element abnormality detection processor which detects abnormality of the imaging element,
wherein the abnormality detection processor detects the occurrence of the abnormal state in a case where abnormality of the imaging element is detected by the imaging element abnormality detection processor.

12. The imaging device according to claim 6, further comprising:
an imaging element abnormality detection processor which detects abnormality of the imaging element,
wherein the abnormality detection processor detects the occurrence of the abnormal state in a case where abnormality of the imaging element is detected by the imaging element abnormality detection processor.

13. The imaging device according to claim 7,
wherein the imaging element abnormality detection processor detects the temperature of the imaging element and detects abnormality of the imaging element in a case where the detected temperature is outside a range set in advance.

14. The imaging device according to claim 8,
wherein the imaging element abnormality detection processor detects the temperature of the imaging element and detects abnormality of the imaging element in a case where the detected temperature is outside a range set in advance.

15. The imaging device according to claim 1, further comprising:
a light source unit which irradiates the subject with light; and
a light source abnormality detection processor which detects abnormality of the light source unit,
wherein the abnormality detection processor detects the occurrence of the abnormal state in a case where abnormality of the light source unit is detected by the light source abnormality detection processor.

16. The imaging device according to claim 15,
wherein the light source abnormality detection processor detects abnormality of the light source unit in a case where disconnection or short-circuiting of the light source unit is detected.

17. The imaging device according to claim 1,
wherein the abnormality detection processor detects abnormal states in steps, and
the imaging device comprises:
a notification processor which gives notification of the abnormal state in a case where an abnormal state of a first step is detected; and
a control processor which stops the imaging in a case where an abnormal state of a second step having a higher degree of abnormality than the first step is detected.

18. The imaging device according to claim 1, further comprising:
a permanent storage unit which has a nonvolatile memory; and
a selection reception processor which receives selection of whether or not to store the nondestructively read image signal read from the storage unit in the permanent storage unit,
wherein the nondestructively read image signal is stored in the permanent storage unit in a case where the selection reception processor selects to store the nondestructively read image signal, and the nondestructively read image signal is not stored in the permanent storage unit in a case where the selection reception processor selects not to store the nondestructively read image signal.

19. The imaging device according to claim 1,
wherein the imaging element is a complementary metal-oxide semiconductor image sensor.

20. An imaging method for imaging a subject in a light-blocking chamber using the imaging device according to claim 1 which performs imaging of the subject using an imaging element configured to nondestructively read an image signal, the imaging method comprising:
performing nondestructive reading of the image signal from the imaging element during imaging of the subject;
storing the nondestructively read image signal; and
reading and outputting the stored image signal in a case where the occurrence of an abnormal state during imaging of the subject is detected, wherein the abnormal state comprises at least one of a defect of the imaging element and light level variation within the light-blocking test chamber during imaging.

\* \* \* \* \*